Oct. 11, 1960    M. C. WILLS    2,955,844
UNIVERSAL ATTACHMENT SUPPORT FOR TRACTORS
Filed March 10, 1958
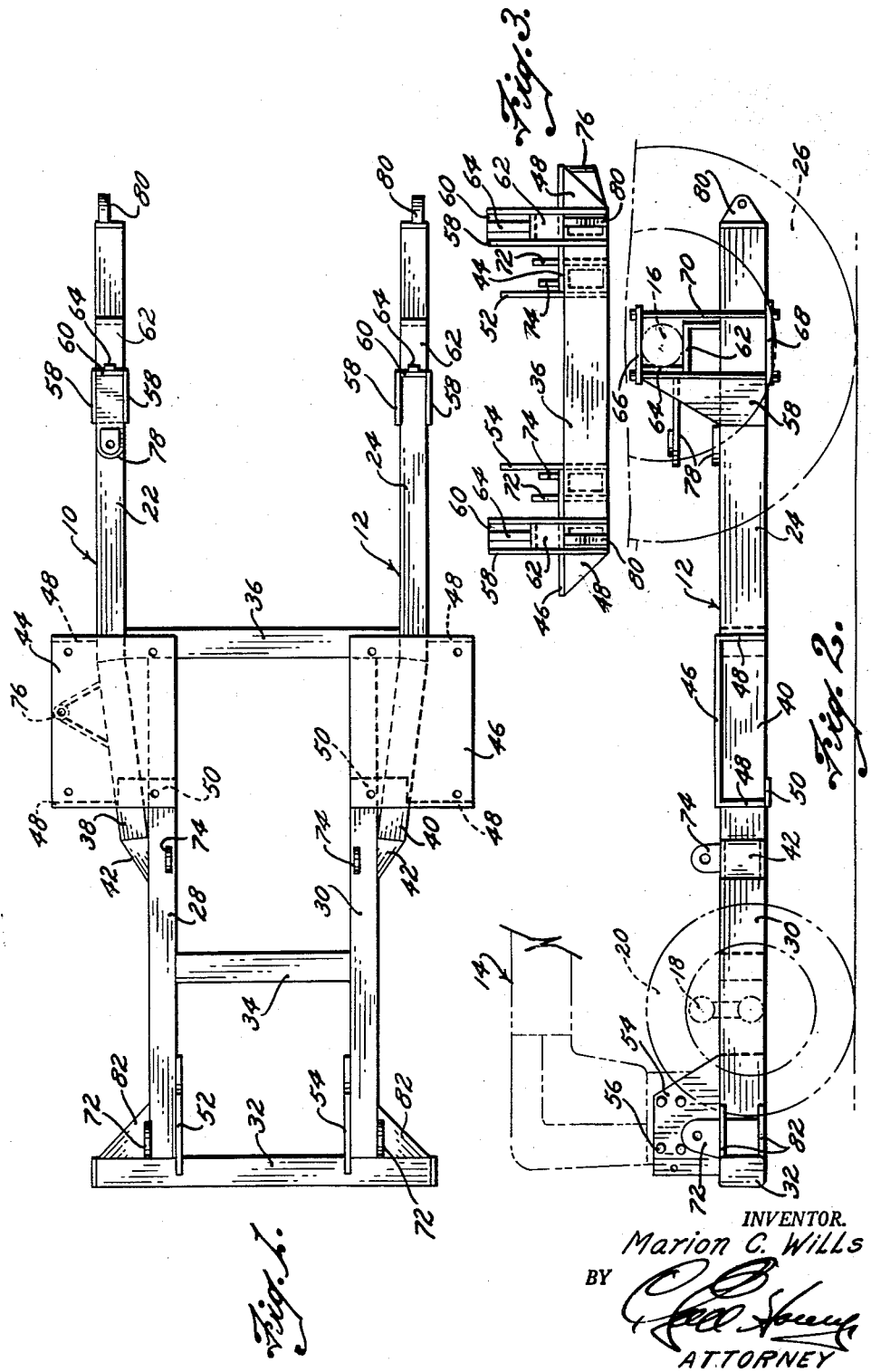
INVENTOR.
Marion C. Wills
BY
ATTORNEY United States Patent Office 2,955,844
Patented Oct. 11, 1960

2,955,844

UNIVERSAL ATTACHMENT SUPPORT FOR TRACTORS

Marion C. Wills, Topeka, Kans., assignor, by mesne assignments, to Koehring Company, Milwaukee, Wis., a corporation of Wisconsin Filed Mar. 10, 1958, Ser. No. 720,216

1 Claim. (Cl. 280—150)

This invention relates to improvements in tractor mounted equipment, and more particularly to a sub-frame assembly for adapting the tractor to alternately receive a large number of differing types of attachments, thereby eliminating the necessity as has heretofore been the practice, of providing a frame for each attachment respectively.

Another important object of the present invention is to provide a sub-frame assembly that may be releasably attached to the tractor but which is of such nature as to permit a more or less permanent mounting of the same on the tractor by virtue of the fact that by its very nature, such assembly will not normally interfere with various uses for the tractor even when no attachment is mounted thereon.

Another important object of the present invention is to provide a universal sub-assembly that is underslung in a manner to be completely out of the way, yet provided with adequate means of receiving the attachments for releasable mounting thereon as may be desired.

A further object of the present invention is to provide a support for tractor attachments that is not only relatively light in weight, yet of itself extremely strong and rigid, but which is adapted for mounting on the tractor itself in a manner to properly transfer all forces to the tractor to eliminate damage to the support itself, as well as to all parts of the tractor and the components of the various attachments that are mounted thereon.

In the drawing:

Fig. 1 is a plan view of a universal attachment support for tractors made pursuant to the present invention.

Fig. 2 is a side elevational view thereof illustrating the way in which the support is mounted on a tractor; and Fig. 3 is a rear end view of the support.

As is clear in the drawing, the support or sub-frame assembly forming the subject matter of the instant invention, includes a pair of longitudinal members broadly designated by the numerals 10 and 12 that are adapted for attachment to tractor 14 in relatively close proximity to the ground as depicted in Fig. 2, the members 10 and 12 spanning the distance between the rear axle 16 and the front axle 18 of the tractor 14.

It is to be understood that the axle 18 of the tractor 14 chosen for illustration, is offset upwardly from the axis of rotation of the front wheels 20. Accordingly, it is to be noted in Fig. 2 that the members 10 and 12 underlie both axles 16 and 18, but in tractors having front axles which are lower than illustrated in Fig. 2, it is a simple expedient to merely offset the forwardmost ends of the members 10 and 12 upwardly to pass over the front axle of such tractors.

In any event, it is to be noted that the members 10 and 12 comprise a pair of beams 22 and 24 that are disposed between the rear wheels 26 of tractor 14, and a pair of stringers 28 and 30 that are disposed between the front wheels 20 of tractor 14, as well as between the beams 22 and 24.

The members 10 and 12 are interconnected by a plurality of crossbars 32, 34 and 36 rigidly interconnecting the stringers 28 and 30 as by welding, the crossbar 36 also joining in a like manner with the beams 22 and 24 therebetween.

While the beams 22 and 24 are in parallelism rearwardly of the crossbar 36, the forwardmost ends 38 and 40 respectively thereof, converge toward the stringers 28 and 30 and are joined thereto by suitable gussets 42.

The beams 22 and 24 are still further connected with the stringers 28 and 30 through the medium of a pair of mounts in the nature of horizontal plates 44 and 46 overlying the members 10 and 12 and welded or otherwise rigidly attached to the stringers 28 and 30, as well as to the ends 38 and 40 of beams 22 and 24 and, if desired, plates 44 and 46 may also be welded directly to the crossbar 36. Here again, it is desirable to brace the plates 44 and 46 through use of a number of gussets 48 therebeneath and welded to the plates 44 and 46, as well as to the beams 22 and 24. Lugs 50 welded to the stringers 28 and 30 and the ends 38 and 40 of beams 22 and 24 therebeneath, serve additionally to tie together the beams 22 and 24 with the stringers 28 and 30.

A plurality of mounts is provided on the members 22 and 24 to releasably attach the sub-frame assembly to the tractor 14. At the front of the tractor 14, such mounts consist of upright webs 52 and 54 on stringers 28 and 30 respectively and disposed in embracing relationship to the front end of tractor 14. A plurality of bolts or other fasteners 56 is provided for each web 52 and 54 to tie the same directly to the tractor 14 in engagement with the frame of tractor 14.

The mounts for the beams 22 and 24 are adapted to releasably secure the sub-frame assembly directly to the rear axle 16 or, more particularly, to the housing for such axle as the case may be. Such mounts include upstanding wings 58 that embrace the corresponding beams 22 and 24 and which are interconnected above such beams by an upstanding wall 60. An L-shaped bracket 62 rearwardly of the wall 60 is attached to the latter, as well as to the upper faces of beams 22 and 24 and brackets 62 are held clamped to axle 16 therebeneath. A vertical strip 64 on the wall 60 above bracket 62 and forwardly of the axle 16, bears against the latter when the rear mounts of the beams 22 and 24 are clamped in place. Such clamping consists of a perforated plate 66 overlying the axle 16 and a similar plate 68 beneath the corresponding beam 22, 24, the plates 66 and 68 being interconnected by a plurality of bolts 70.

Manifestly, the front and rear mounts cooperate in preventing any tendency of the members 10 and 12 to swing vertically about the rear axle 16 as an axis, and the rigid interconnection between the members 10 and 12 afforded by the crossbars 32, 34 and 36, likewise cooperate with such unique mounts to obviate twisting of any part of the sub-frame assembly. Still further, it is to be noted that reliance is not made solely upon the front mounts to prevent aft movement, since the rear mounts are in adequate abutting relationship to the rear axle 16.

The arrangement of the beams 22 and 24 in partial overlapping relationship to the stringers 28 and 30, and the interconnection above described with respect to the front and rear portions of the members 10 and 12, which includes the plates 44 and 46, presents an extremely strong midsection for the sub-frame assembly where the bulk of the weight of the attachments is carried when such attachments are secured to the plates 44 and 46.

Various appurtenances are illustrated for use, depending upon the nature of the attachment to be mounted on the tractor through use of the sub-frame assembly. For example, upstanding framework forming a part of the attachment resting on the plates 46 may be suitably braced by angle elements (not shown) connected with upstanding, perforated ears 72 and 74 on the stringers 28 and 30. In the event such attachment is provided with a standard that must rotate about a vertical axis, there is provided bearing means 76 on the plate 44 for such purpose. A hydraulic piston and cylinder assembly may pivotally interconnect such rotatable standard and the beam 22 by virtue of spaced, horizontal, perforated lugs 78 extending forwardly from the proximal rear mount and secured to the upper face of beam 22 as shown.

Still further, rearwardly-extending, perforated ears 80 are provided on the rearmost ends of the beams 22 and 24 for whatever purpose may be desired.

Finally, the over-all unit is still further strengthened by extending the front crossbar 32 beyond the stringers 28 and 30 and connecting such crossbar 32 with the said stringers by suitable gussets 82.

Having thus described the invention what is claimed as new and desired to be secured by Letters Patent is:

A universal sub-frame assembly for mounting any one of a number of various attachments upon a tractor of the kind having a frame and a rear axle housing, said assembly comprising a pair of spaced, longitudinal members adapted to underlie the axles of the tractor in relatively close proximity to the ground; an attachment support resting upon each member respectively, said members including a pair of beams normally disposed between the rear wheels of the tractor and a pair of stringers engaging and rigidly secured to the beams therebetween, and normally disposed between the front wheels of the tractor, each stringer having a mount adapted for releasable attachment to said frame of the tractor, each beam having a mount adapted for releasable attachment to the rear axle housing of the tractor, said supports comprising horizontal plates, each plate overlying and rigidly connecting a corresponding beam with the proximal stringer, said plates extending outwardly and laterally beyond the beams; and a number of cross bars interconnecting the stringers, one of the cross bars also joining the members.

References Cited in the file of this patent
UNITED STATES PATENTS

| | | |
|---|---|---|
| 1,772,071 | Davey | Aug. 5, 1930 |
| 1,930,862 | Ross | Oct. 17, 1933 |
| 2,242,826 | Keeler | May 20, 1941 |
| 2,396,107 | Lessmann | Mar. 5, 1946 |
| 2,440,550 | Martin | Apr. 27, 1948 |
| 2,560,674 | Westall | July 17, 1951 |
| 2,702,137 | Ives | Feb. 15, 1955 |